(12) United States Patent
Chretien et al.

(10) Patent No.: US 7,952,251 B2
(45) Date of Patent: May 31, 2011

(54) SYSTEMS AND METHODS FOR SHIELDING AN ELECTRIC MACHINE

(75) Inventors: Ludovic Chretien, Fort Wayne, IN (US); Rachele B. Cocks, Huntington, IN (US)

(73) Assignee: RBC Manufacturing Corporation, Wausau, WI (US)

( * ) Notice: Subject to any disclaimer, the term of this patent is extended or adjusted under 35 U.S.C. 154(b) by 205 days.

(21) Appl. No.: 12/171,918

(22) Filed: Jul. 11, 2008

(65) Prior Publication Data
US 2010/0007235 A1    Jan. 14, 2010

(51) Int. Cl.
*H02K 3/34* (2006.01)
(52) U.S. Cl. ........................ 310/215; 310/214
(58) Field of Classification Search ............... 310/71, 310/85–86, 45, 72, 214–215
See application file for complete search history.

(56) References Cited

U.S. PATENT DOCUMENTS

| | | | |
|---|---|---|---|
| 3,781,927 A | | 1/1974 | Zakaras |
| 4,308,476 A | * | 12/1981 | Schuler ............................ 310/45 |
| 4,318,020 A | * | 3/1982 | Meyer ............................ 310/215 |
| 5,661,353 A | | 8/1997 | Erdman et al. |
| 5,821,649 A | | 10/1998 | Langhorst |
| 5,821,652 A | | 10/1998 | Hyypio |
| 5,952,761 A | * | 9/1999 | Itoh et al. ....................... 310/215 |
| 5,979,087 A | | 11/1999 | Bell et al. |
| 6,011,338 A | | 1/2000 | Bell et al. |
| 6,134,126 A | | 10/2000 | Ikekame et al. |
| 6,176,691 B1 | * | 1/2001 | Tsubokawa ................. 417/410.3 |
| 6,202,285 B1 | | 3/2001 | Bell |
| 6,720,692 B2 | | 4/2004 | Bell |
| 6,756,712 B1 | * | 6/2004 | Schuren ........................... 310/71 |
| 7,250,700 B2 | * | 7/2007 | Maki-Ontto ................. 310/68 R |
| 2006/0145560 A1 | * | 7/2006 | Maki-Ontto .................. 310/215 |

* cited by examiner

*Primary Examiner* — Thanh Lam
(74) *Attorney, Agent, or Firm* — Armstrong Teasdale LLP

(57) ABSTRACT

A method for reducing leakage currents in an electric machine is described. The method includes positioning a plurality of leakage current shields between windings and teeth of a stator, and coupling at least one of the plurality of leakage current shields to a reference point, wherein an electric potential at the reference point is not earth ground.

19 Claims, 3 Drawing Sheets

US 7,952,251 B2

SYSTEMS AND METHODS FOR SHIELDING AN ELECTRIC MACHINE

BACKGROUND OF THE INVENTION

The field of the invention relates generally to electric machines and more specifically to the reduction of leakage current present in electric machines.

Leakage current is produced during the operation of various types of electric machines, for example, electric motors and electric generators. Typically, an electric machine includes a stator and a rotor. The stator includes a plurality of teeth that are wrapped with wire windings. The electric machine may include an insulation between the windings and the stator teeth. This configuration of windings, insulation, and stator teeth creates a capacitance, referred to as machine parasitic capacitance. High frequency switching of voltages applied to the windings creates a potential difference across the parasitic capacitance, and as a result, a circulating current generally referred to as leakage current when the stator enclosure is tied to earth ground. The leakage current across the parasitic capacitance prevents the power lines feeding the system to be balanced, as part of the supplied current returns through earth ground. Electric machines that include internal shielding to reduce the presence of shaft voltages and bearing currents typically couple the shielding to earth ground. However, coupling a shield of this type to earth ground does not reduce leakage current.

Leakage current may cause tripping of a circuit breaker, for example, a circuit breaker included in a ground fault circuit interrupter (GFCI). A GFCI is positioned between a power source and a device to prevent injury due to electric shock. For example, in the United States of America, a typical 120 Volt electrical outlet includes connections for a "hot" wire, a "neutral" wire, and an "earth ground" wire. The GFCI senses when there is a difference between the electric currents in the hot wire and the neutral wire. Detection of a difference between those currents may indicate a malfunction. For example, a difference between the currents may indicate that electric current is traveling to ground through an unintended path, such as if a person has come in contact with the hot wire and is providing an electrical path to ground. The difference between the currents in the hot wire and the neutral wire may often be qualified as leakage current. Leakage current does not return via the neutral wire, but rather may be present in a ground wire. Tripping of a GFCI due to leakage current may be referred to as nuisance tripping. A reduction of leakage current may prevent nuisance tripping of a GFCI.

BRIEF DESCRIPTION OF THE INVENTION

In one aspect, a method for reducing leakage currents in an electric machine is provided. The method includes positioning a plurality of leakage current shields between windings and teeth of a stator, and coupling at least one of the plurality of leakage current shields to a reference point, wherein an electric potential at the reference point is not earth ground.

In another aspect, a leakage current shield for an electric machine is provided. The electric machine includes a stator that includes a plurality of windings positioned around at least one stator tooth. The leakage current shield includes a conductive layer configured for placement between at least one of the plurality of windings and the at least one stator tooth. The conductive layer is coupled to a reference point having an electric potential that is not earth ground. The leakage current shield also includes a first insulative layer positioned between the at least one stator tooth and the conductive layer, and a second insulative layer positioned between the windings and the conductive layer.

In yet another aspect, an electric machine is provided. The electric machine includes a rotor and a stator that includes a plurality of teeth and a plurality of windings. Each of the plurality of windings is positioned around at least one of the plurality of teeth. The electric machine also includes a plurality of leakage current shields positioned between the plurality of teeth and the plurality of windings.

DETAILED DESCRIPTION OF THE INVENTION

Figure 1:
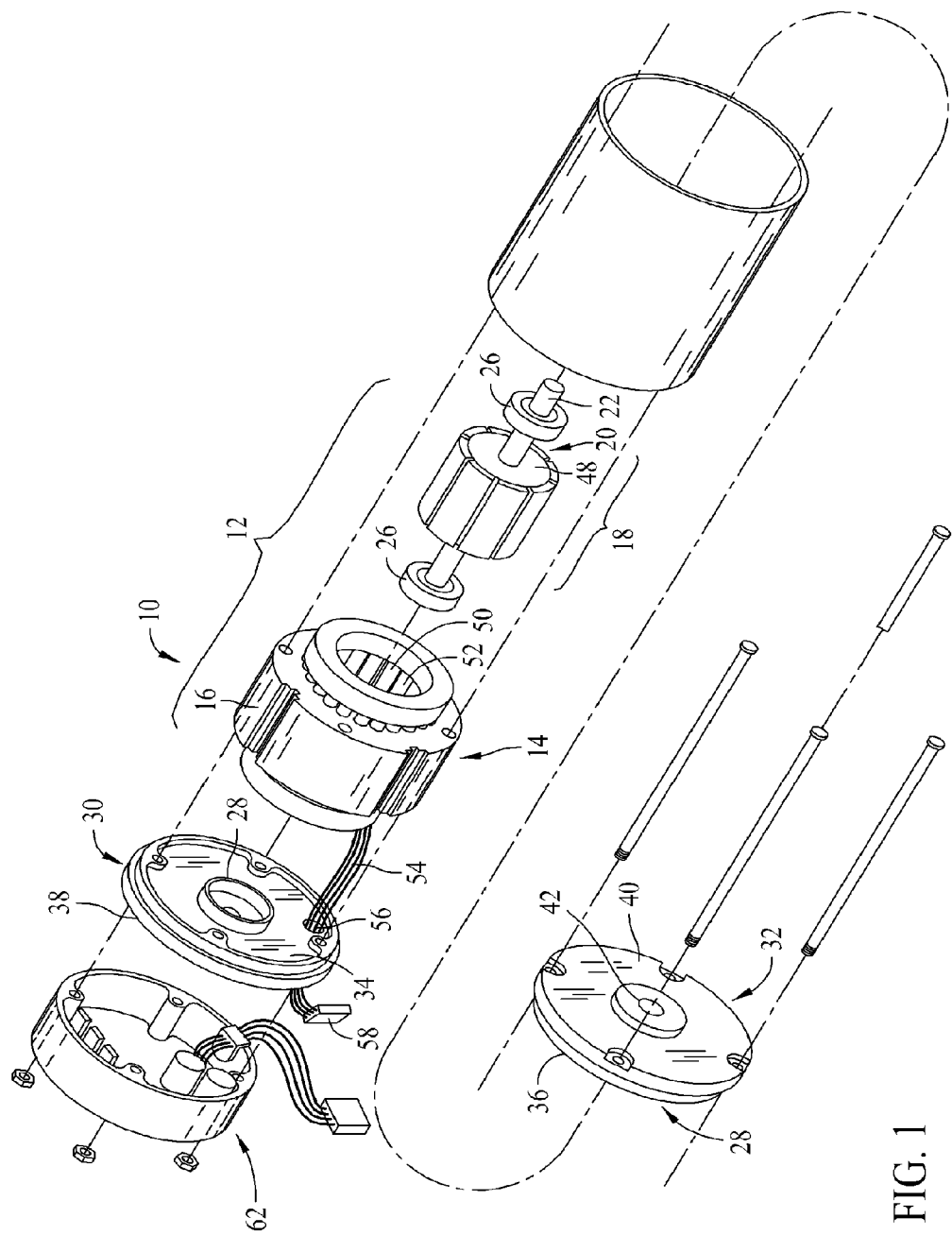
FIG. 1 is an expanded view illustration of an exemplary electric motor.

FIG. 1 is an expanded view illustration of an exemplary electric machine assembly 10. In the exemplary embodiment, machine assembly 10 includes an alternating current (AC) motor 12 having a stationary assembly 14 including a stator or core 16 and a rotatable assembly 18 including a rotor 20 and a shaft 22. A fan (not shown) or other assembly to be driven, such as an assembly for moving air through an air handling system, engages shaft 22. Although machine assembly 10 is described and illustrated herein as including motor 12, machine assembly 10 may function as described herein when including a generator.

In the exemplary embodiment, rotor 20 is mounted on and keyed to shaft 22, journaled for rotation in bearings 26. Bearings 26 are mounted in bearing supports 28 of a first end member 30 and a second end member 32. The end members 30 and 32 are substantially parallel to each other. The end members 30 and 32 have inner facing sides 34 and 36 between which the stationary assembly 14 and the rotatable assembly 18 are located. Each end member 30 and 32 has an outer side 38 and 40 opposite its inner side 34 and 36. Additionally, second end member 32 has an aperture 42 for the shaft 22 to pass through and extend out from the outer side 40.

In the exemplary embodiment, the rotor 20 comprises a plurality of metal bars 48, often referred to as a squirrel-cage, and is rotatable within the bore of stator 16. Stator 16 comprises a plurality of windings 50 adapted to be electrically energized to generate an electromagnetic field. Windings 50 are coils of wire wound around teeth 52 of the laminated stator core 16. The winding end turns extend beyond the stator end faces and winding terminal leads 54 are brought out through an aperture 56 in the first end member 30 terminating in a connector 58. Motor control circuitry 62 and a power source (not shown in FIG. 1) are coupled to windings 50 by connector 58. While stationary assembly 14 is illustrated for purposes of disclosure, it is contemplated that other stationary assemblies of various other constructions having different shapes and with different numbers of poles and/or teeth may be utilized.

AC motor 12 as described herein merely for purposes of disclosure is an eight rotor-pole motor, but it will be understood that the motor described herein may include any even number of rotor poles and the number of stator poles may be a multiple of the number of rotor poles. Furthermore, while motor 12 is described herein as an AC asynchronous motor, any type of electric motor that produces leakage current may benefit from a reduction in leakage current. In one exemplary embodiment not shown in FIG. 1, a three-phase motor includes six rotor pole pairs and eighteen stator poles.

Figure 2:
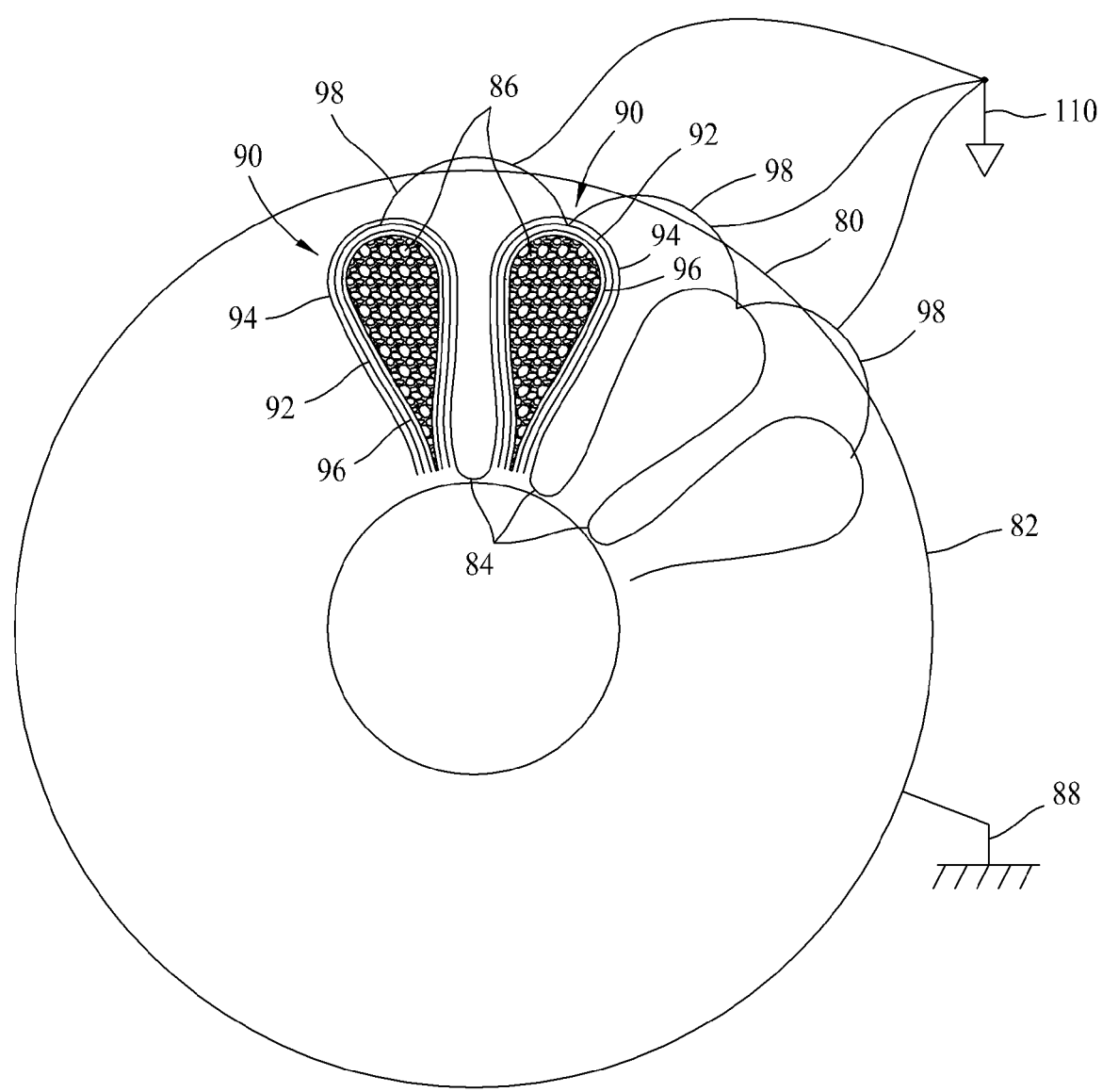
FIG. 2 is a partial cross-sectional illustration of an exemplary stator of the electric motor shown in FIG. 1.

FIG. 2 is a partial cross-sectional illustration of an exemplary stator 80 that may be included within electric motor 12 shown in FIG. 1. Stator 80 includes a stator shell 82, and a stator core 83 that includes a plurality of teeth 84. In the exemplary embodiment, a plurality of windings 86 are wrapped around each of the plurality of teeth 84. In an alternative embodiment, windings 86 may be wrapped around two teeth 84, or any number of teeth 84 that allows electric motor 12 to function as described herein. In the exemplary embodiment, stator shell 82 and stator core 83 are coupled to earth ground 88.

In the exemplary embodiment, a leakage current shield 90 is positioned between windings 86 and teeth 84. Leakage current shield 90 includes a conductive layer 92 positioned between two isolative layers 94 and 96. In the exemplary embodiment, leakage current shield 90 is fabricated of a copper layer positioned between two polyester insulation layers, however, conductive layer 92 and isolative layers 94 and 96 may be fabricated from any material that enables leakage current shield 90 to function as described herein. At least one electrical connector 98 couples conductive layers 92 in parallel to a reference point 110. In the exemplary embodiment, reference point 110 is a position, for example, a position within Motor control circuitry 62 (shown in FIG. 1) that is at an electronic ground potential. Reference point 110 (also referred to herein as electronic ground 110) is a potential that is different from earth ground 88.

Figure 3:
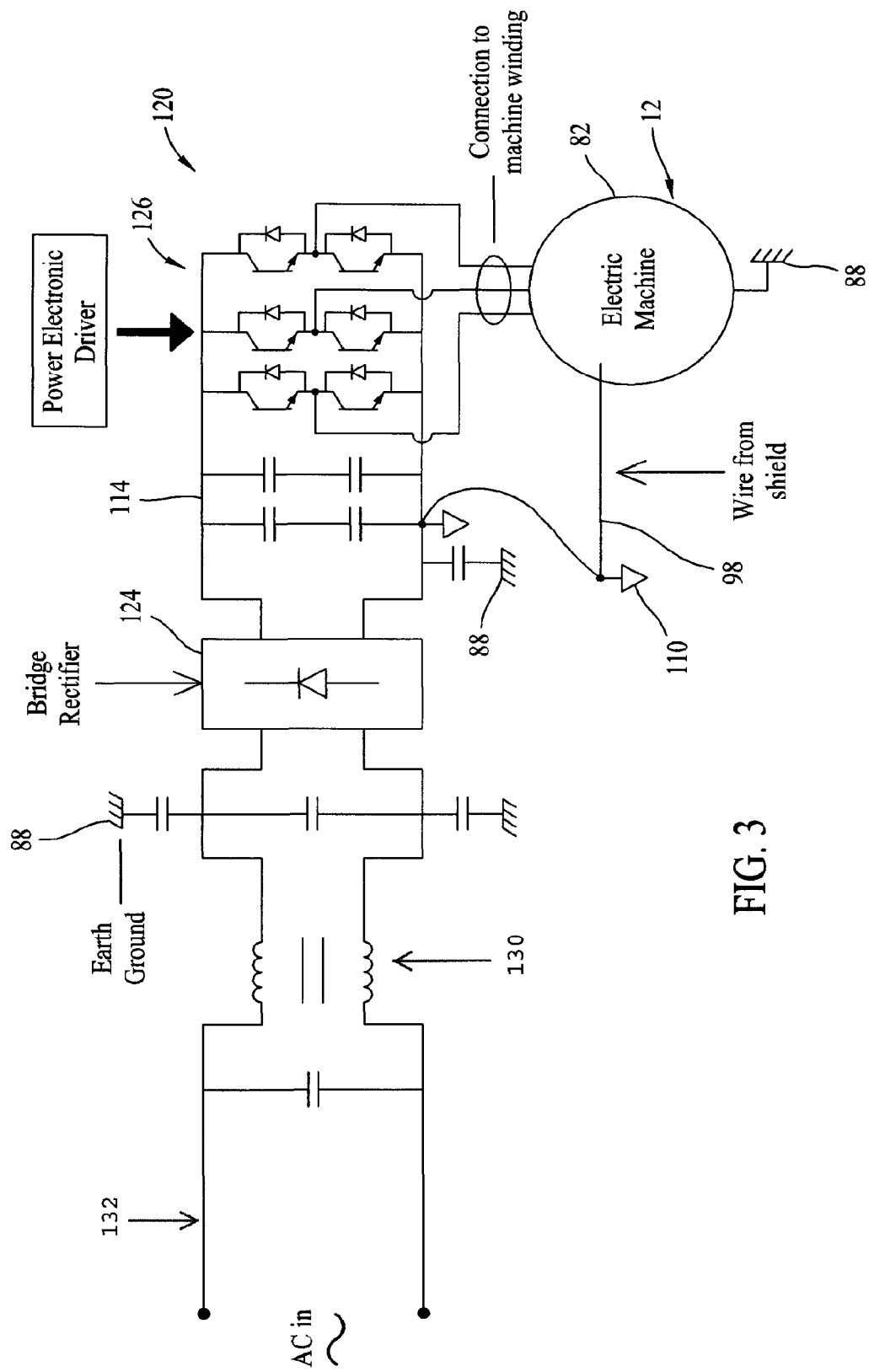
FIG. 3 is a circuit diagram of an exemplary drive circuit for an electric motor.

FIG. 3 is a circuit diagram of an exemplary drive circuit 120 for electric motor 12. Drive circuit 120 provides electrical power and control signals to electric motor 12. In an exemplary embodiment, drive circuit 120 is a variable frequency drive and/or an adjustable speed drive. Switching the voltages provided to windings 86 (shown in FIG. 2), as performed by a variable frequency drive and/or an adjustable speed drive, energizes the parasitic capacitance, which is a contributing factor to the creation of leakage current.

Connector 98 couples the conductive layers of the leakage current shield 90 (shown in FIG. 2) to electronic ground 110. In the exemplary embodiment, connector 98 couples the conductive layers 92 of the leakage current shield 90 (shown in FIG. 2) to drive circuit 120 at a position between a bridge rectifier 124 and power electronic drivers 126. More specifically, positions with drive circuit 120, for example at an inverter 114, provide the electronic ground 110 used by leakage current shield 90. Connector 98 may couple the conductive layers of leakage current shield (shown in FIG. 2) to any position (i.e., reference point) within drive circuit 120 that has a potential that is different than earth ground 88.

Current leakage shield 90 operates as a capacitor positioned between windings 86 (shown in FIG. 2) and stator shell 82. In the exemplary embodiment, by maintaining this capacitor at electronic ground potential 110 that is different than earth ground 88, leakage currents from motor 12 (shown in FIG. 1) and/or drive circuit 120 (shown in FIG. 3) are reduced and/or suppressed. By reducing and/or suppressing leakage current, current leakage shield 90 facilitates a reduction in nuisance tripping of a GFCI 130 positioned between motor 12 and drive circuit 120 (shown in FIG. 3), and a power source 132. Additionally, by reducing and/or suppressing leakage current, current leakage shield 90 facilitates a reduction in electromagnetic interference (EMI) created by motor 12 and/or drive circuit 120. Furthermore, current leakage shield 90 also facilitates a reduction in shaft voltages and bearing currents present in motor 12.

The above-described methods and apparatus are cost-effective and highly reliable for reducing leakage currents created by a variable frequency drive and motor combination. The methods and apparatus describe positioning a leakage current shield within an electric motor and coupling that shield to an electronic ground. The alternating conductor and insulator layers of the leakage current shield act as a capacitor, which reduces and/or suppresses the leakage ground currents produced by an electric motor and/or a variable frequency drive. The reduction in leakage current may reduce EMI produced by the motor and drive circuitry, shaft voltages and bearing currents present in the motor, and the frequency of nuisance tripping of GFCI. The reduction in leakage current may also increase efficiency of the motor. The reduction in leakage current is achieved while limiting complications to the manufacturing process used to create the motor and drive circuit, while limiting, and potentially not changing, a motor's specifications. The reduction is also achieved while maintaining a substantially similar input voltage as would be used with a motor that does not include the leakage current shield.

While the invention has been described in terms of various specific embodiments, those skilled in the art will recognize that the invention can be practiced with modification within the spirit and scope of the claims.

What is claimed is:

1. A method for reducing leakage currents in an electric machine, said method comprising:
    positioning a plurality of leakage current shields between windings and teeth of a stator; and
    coupling at least one of the plurality of leakage current shields to a reference point, wherein an electric potential at the reference point is not earth ground.

2. A method according to claim 1, wherein positioning a plurality of leakage current shields between windings and teeth of a stator comprises:
    positioning a first insulative layer adjacent to at least one tooth;
    positioning a conductive layer adjacent the first insulative layer; and
    positioning a second insulative layer adjacent the conductive layer.

3. A method according to claim 2, wherein coupling the plurality of leakage current shields to the reference point comprises coupling the conductive layers of the plurality of leakage current shields in parallel.

4. A method according to claim 1, wherein coupling the plurality of leakage current shields to the reference point comprises coupling the plurality of leakage current shields to a motor drive circuit at a position having an electric potential that is different than earth ground.

5. A method according to claim 1, wherein positioning the plurality of leakage current shields between windings and teeth of the stator facilitates reducing shaft voltages and bearing currents in the electric machine.

6. A method according to claim 1, wherein positioning the plurality of leakage current shields between windings and teeth of the stator facilitates reducing electromagnetic interference (EMI) created by at least one of the electric machine and a drive circuit.

7. A leakage current shield for an electric machine, the electric machine having a stator that includes a plurality of windings positioned around at least one stator tooth, said leakage current shield comprising:
    a conductive layer configured for placement between at least one of the plurality of windings and the at least one stator tooth, said conductive layer coupled to a reference point having an electric potential that is not earth ground;

a first insulative layer positioned between the at least one stator tooth and the conductive layer; and a second insulative layer positioned between the windings and the conductive layer.

8. A leakage current shield in accordance with claim 7 further comprising a connector configured to couple said conductive layer to said reference point.

9. A leakage current shield in accordance with claim 7, wherein said electric machine is coupled to and controlled by a variable frequency drive circuit.

10. A leakage current shield in accordance with claim 9, wherein said reference point is at a position within said variable frequency drive circuit having an electric potential that is different than earth ground.

11. A leakage current shield in accordance with claim 7, wherein said conductive layer coupled to a potential that is not earth ground further facilitates reducing one or more of: a shaft voltage and a bearing current present in said electric machine, and electromagnetic interference (EMI) created by said electric machine.

12. An electric machine comprising:

a rotor;

a stator including a plurality of teeth and a plurality of windings, each of said plurality of windings positioned around at least one of said plurality of teeth; and a plurality of leakage current shields positioned between said plurality of teeth and said plurality of windings, said plurality of leakage current shields comprising a conductive layer coupled to a reference point having an electric potential that is not earth ground.

13. An electric machine in accordance with claim 12, wherein each of said plurality of leakage current shields further comprises:

a first insulative layer positioned between at least one of said plurality of teeth and said conductive layer; and a second insulative layer positioned adjacent to said conductive layer, opposite to said first insulative layer.

14. An electric machine in accordance with claim 12, wherein said plurality of leakage current shields are coupled together in parallel.

15. An electric machine in accordance with claim 12, wherein at least one of said plurality of leakage current shields is coupled to a drive circuit at a position having a potential that is different than earth ground.

16. An electric machine in accordance with claim 12, said electric machine configured to be coupled to and controlled by a variable frequency drive circuit.

17. A method according to claim 4, wherein the motor drive circuit is configured to control operation of the electric machine and a ground fault circuit interrupter is coupled between the motor drive circuit and a power source, wherein coupling at least one of the plurality of leakage current shields to the reference point facilitates preventing nuisance tripping of the ground fault circuit interrupter caused by leakage current flowing from stator windings to earth ground.

18. A leakage current shield in accordance with claim 9, wherein a ground fault circuit interrupter is coupled between said variable frequency drive circuit and a power source, said current shield configured to prevent nuisance tripping of said ground fault circuit interrupter caused by leakage current flowing from the plurality of stator windings to earth ground.

19. An electric machine in accordance with claim 15, wherein a ground fault circuit interrupter is coupled between said drive circuit and a power source, said plurality of leakage current shields configured to prevent nuisance tripping of said ground fault circuit interrupter caused by leakage current flowing from the plurality of stator windings to earth ground.

* * * * *